United States Patent [19]

Kasugai

[11] Patent Number: 4,952,347
[45] Date of Patent: Aug. 28, 1990

[54] METHOD OF MANUFACTURING A FUEL TANK FROM SYNTHETIC RESIN

[75] Inventor: Joji Kasugai, Ichinomiya, Japan

[73] Assignee: Toyoda Gosei Co., Ltd., Nishikasugai, Japan

[21] Appl. No.: 340,441

[22] Filed: Apr. 19, 1989

[30] Foreign Application Priority Data

May 28, 1988 [JP] Japan ............................... 63-131198

[51] Int. Cl.$^5$ ........................ B29C 49/20; B29C 65/22
[52] U.S. Cl. ...................................... 264/26; 29/421.1; 29/428; 264/515; 264/516; 425/525
[58] Field of Search ............... 264/516, 515, 514, 512, 264/25, 26; 425/525; 29/421.1, 428

[56] References Cited

U.S. PATENT DOCUMENTS

| | | | |
|---|---|---|---|
| 3,705,931 | 12/1972 | Confer et al. | 264/516 |
| 3,919,373 | 11/1975 | Kormendi | 264/516 |
| 4,423,000 | 12/1983 | Teraoka | 425/525 |
| 4,719,072 | 1/1988 | Kojima et al. | 264/515 |
| 4,826,517 | 5/1989 | Norman | 264/516 |

FOREIGN PATENT DOCUMENTS

| | | | |
|---|---|---|---|
| 61-67237 | 5/1986 | Japan. | |
| 61-89824 | 5/1986 | Japan. | |
| 1225027 | 10/1986 | Japan | 264/516 |

Primary Examiner—Jan H. Silbaugh
Assistant Examiner—Catherine Timm
Attorney, Agent, or Firm—Cushman, Darby & Cushman

[57] ABSTRACT

A fuel tank of synthetic resin is provided with a holding plate of synthetic resin arranged within the tank, and an outside wall covering the holding plate and formed by blow molding. Parts such as a level gauge projecting from the outside wall and having a nipple portion are held to the holding plate. At the manufacturing state of the tank, parts are fixed to the holding plate, and in this state, a blow molding mold is set and the outside wall of the tank is formed by the blow molding. In this case, the outer periphery of the holding plate is fixed to the inner circumferential surface of the outside wall, and the inner circumferential surface of the outside wall is pressed to the outer circumferential surface of the nipple portion of the component part and the circumference of the nipple portion is sealed. And then the outside wall covering the top end surface of the nipple portion is cut thereby the tank is manufactured.

18 Claims, 12 Drawing Sheets

METHOD OF MANUFACTURING A FUEL TANK FROM SYNTHETIC RESIN

BACKGROUND OF THE INVENTION

1. Field of the Invention

The present invention relates to a method of manufacturing a fuel tank for automobiles, and more particularly to a method of manufacturing a fuel tank of synthetic resin formed by blow molding.

2. Description of the Prior Art

A method of manufacturing a fuel tank of synthetic resin by blow molding in the prior art is disclosed, for example, in Japanese Patent Laid-open Publication No. Sho 61-89824.

In the method disclosed in this reference, a baffle plate as a wave eliminating member is set as an insert to a mold for blow molding, and an outside wall of the tank is formed by blow molding and the baffle plate is fixed to the inner circumferential surface of the outside wall. The fuel tank of synthetic resin is thereby manufactured.

However, the fuel tank is usually provided at the inside with parts to construct definite functions, such as a fuel level gauge, a fuel cutoff valve, a fuel pump or the like. Consequently, when these parts are installed to the fuel tank, the outside wall formed by blow molding is provided with a hole for mounting, and parts are mounted through the hole. In this case, in order to secure the air tightness at the periphery of the hole after the mounting, a prescribed rubber part for a seal becomes necessary.

Consequently, in the manufacturing method of the prior art disclosed in this reference, when a fuel tank as a final product having prescribed parts is manufactured, after an outside wall is formed by blow molding, not only parts must be assembled but also boring machining or assembling of a rubber part for a seal must be performed, thereby increasing the manufacturing process number and the cost.

SUMMARY OF THE INVENTION

An object of the present invention is to provide a method of manufacturing a fuel tank of synthetic resin having parts to construct definite functions (hereinafter referred to as "component parts"), wherein the manufacturing is simple and easy, and the manufacturing process number and the cost can be reduced.

The foregoing object can be attained by a method of manufacturing a fuel tank of synthetic resin which is provided with an insert member arranged within the tank, and an outside wall covering the insert member and formed by blow molding using a parison of thermoplastic region and a mold for blow molding to form a cavity of a prescribed shape at a mold tightening state, the insert member being composed of a component part with a nipple portion projected from the outside wall and a holding plate of synthetic resin holding the component part and arranged in the horizontal direction, the method of manufacturing the tank comprising:

the step of arranging the axial direction of the nipple portion of the component part in a perpendicular direction to the holding plate and fixing the component part to the holding plate and assembling the insert member for preparation;

the step of arranging the holding plate into the mold for blow molding at an opened state in a perpendicular direction to the mold tightening direction of the mold and setting the insert member;

the step of arranging the parison around the insert member set to the mold along the holding plate;

the step of tightening the mold and pressing the parison to the outer periphery of the holding plate and the outer circumferential surface of the nipple portion of the component part and injecting air into the parison and pressing the parison to the cavity inner circumferential surface of the mold and molding the outside wall in blow molding;

the step of removing a molding article from the mold, the molding article being molded by the mold; and the step of cutting the parison at a position to uncover the top end surface of the nipple portion of the component part in the molding article removed from the mold.

In the method of manufacturing a fuel tank of synthetic resin according to the present invention, component parts are previously fixed to a holding plate of synthetic resin being used as an insert member to be set as an insert to a blow molding mold to mold an outside wall and in this state the outside wall is formed around the insert member by blow molding and the holding plate is fixed to the inner circumferential surface of the outside wall.

Consequently, after the blow molding, a hole need not be provided to install the component parts, but when the outside wall is molded by blow molding, the component parts can be arranged at the same time within the outside wall through the holding plate.

Since the inner circumferential surface of the outside wall is pressed during the blow molding to the outer circumferential surface of the nipple portion projected from the fuel tank in the component parts, the component parts fixed to the holding plate are airtightly secured to the outside wall. A rubber part for a seal need not be separately assembled.

Accordingly, in method of manufacturing a fuel tank of synthetic resin of the invention, when the fuel tank as the final product provided with prescribed parts is manufactured, boring machining after the blow molding or assembling of a rubber part for seal becomes unnecessary although needed in the prior art, thereby the manufacturing becomes simple and easy and the manufacturing process number and the cost can be reduced.

DESCRIPTION OF THE PREFERRED EMBODIMENTS

Preferred embodiments of the invention will now be described referring to the accompanying drawings.

Figure 5:
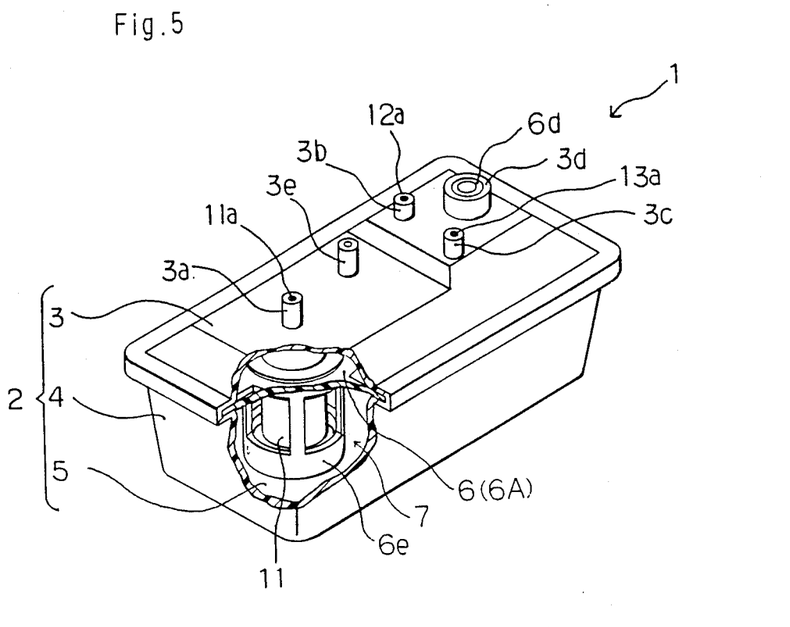
FIG. 5 is a perspective view partly cutaway of a fuel tank to be manufactured by the first embodiment.

A fuel tank 1 manufactured in a first embodiment, as shown in FIG. 5, is in rectangular parallelepiped form where a side wall 4 surrounds between a rectangular upper wall 3 and a bottom wall 5. A insert member 7 is arranged within the tank 1 through a holding plate 6 of synthetic resin which is fixed and held so as to be grasped by the inner circumferential surface of the side wall 4.

An outside wall 2, constructed of the upper wall 3, the bottom wall 5 and the side wall 4, is formed by blow molding, and made of synthetic resin such as polyethylene, polyamide or the like.

The upper wall 3 is protruded at a rear side, and a covering portion 3a is pressed to outer the circumferential surface of a nipple portion 11a of a fuel pump 11 is formed at the center of front side of the upper wall 3. Covering portions 3b, 3c pressed respectively to outer circumferential surface of a nipple portion 12a of a fuel cutoff valve 12 and outer circumferential surface of a nipple portion 13a of a fuel level gauge 13 are formed at rear side of the upper wall 3 (refer to FIGS. 3~5). A covering portion 3d pressed to the outer circumferential surface of a pipe portion 6d to be connected to a fuel injection pipe (not shown) is formed at rear side of the upper wall 3, and a nipple portion 3e for return fuel is formed in the vicinity of intermediate position in the longitudinal direction of the upper wall 3.

Figure 3:
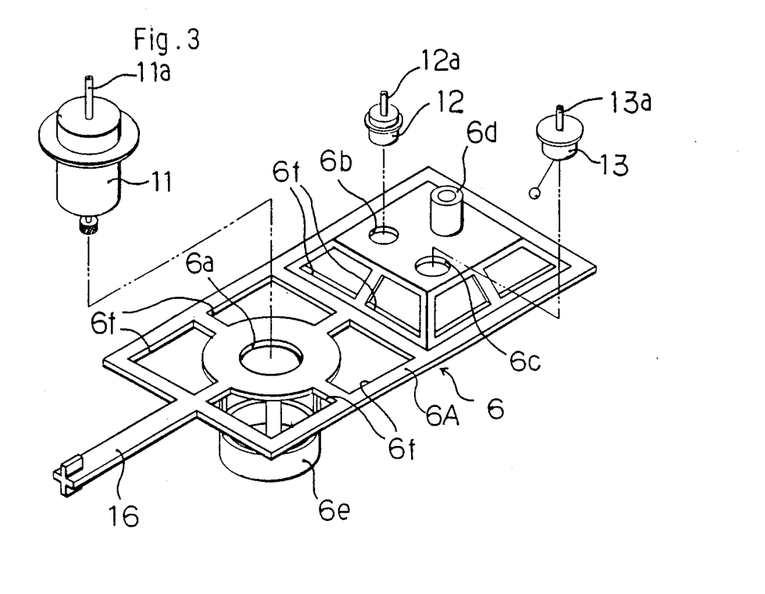
FIG. 3 is a perspective view of a holding plate to be used in the first embodiment.

The holding plate 6 of synthetic resin is formed by injection molding from material such as polyethylene, polyamide or the like being the same as that of the outside wall 2, so that melting bonding with the outside wall 2 becomes good during the blow molding of the outside wall 2. The holding plate 6 is provided with a base portion 6A of flat plate form formed in the horizontal direction, and a pipe portion 6d projected upward and penetrated at rear side of the base portion 6A.

The base portion 6A is protruded at rear side as shown in FIG. 3, and an assembling hole 6a for assembling the fuel pump 11 is formed at the center of front side of the base portion 6A. An assembling hole 6b for assembling the fuel cutoff valve 12 and an assembling hole 6c for assembling the fuel level gauge 13 are formed respectively at rear side of the base portion 6A. Further, a swivel tank 6e formed integrally during molding the holding plate 6 is projected at lower side of periphery of the assembling hole 6a (refer to FIGS. 1 and 2).

The base portion 6A is provided with a through hole 6f for thickness reducing penetrated in the vertical direction except for the outer periphery, the assembling holes 6a, 6b, 6c, the pipe portion 6d and the swivel tank 6e.

The base portion 6A is provided with a set portion 16 extending from the outer periphery in consideration of setting to a mold 21 during the blow molding of the outside wall 2 after the injection molding. The set portion 16 is cut off after molding the outside wall 2.

Figure 4:
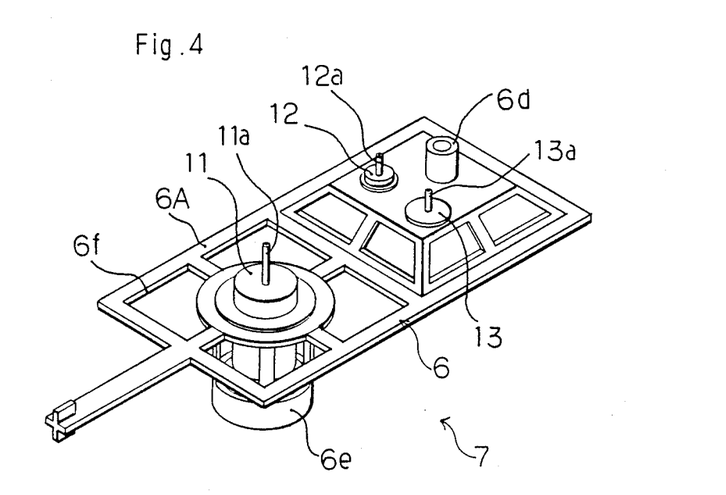
FIG. 4 is a perspective view of a insert member to be used in the first embodiment, illustrating the state where the component parts are fixed to the holding plate.

Fixing of the fuel pump 11, the fuel cutoff valve 12 and the fuel level gauge 13 to the holding plate 6 is performed using prescribed thread tightening, welding or the like after being inserted to each of the assembling holes 6a, 6b, 6c.

Figure 2:
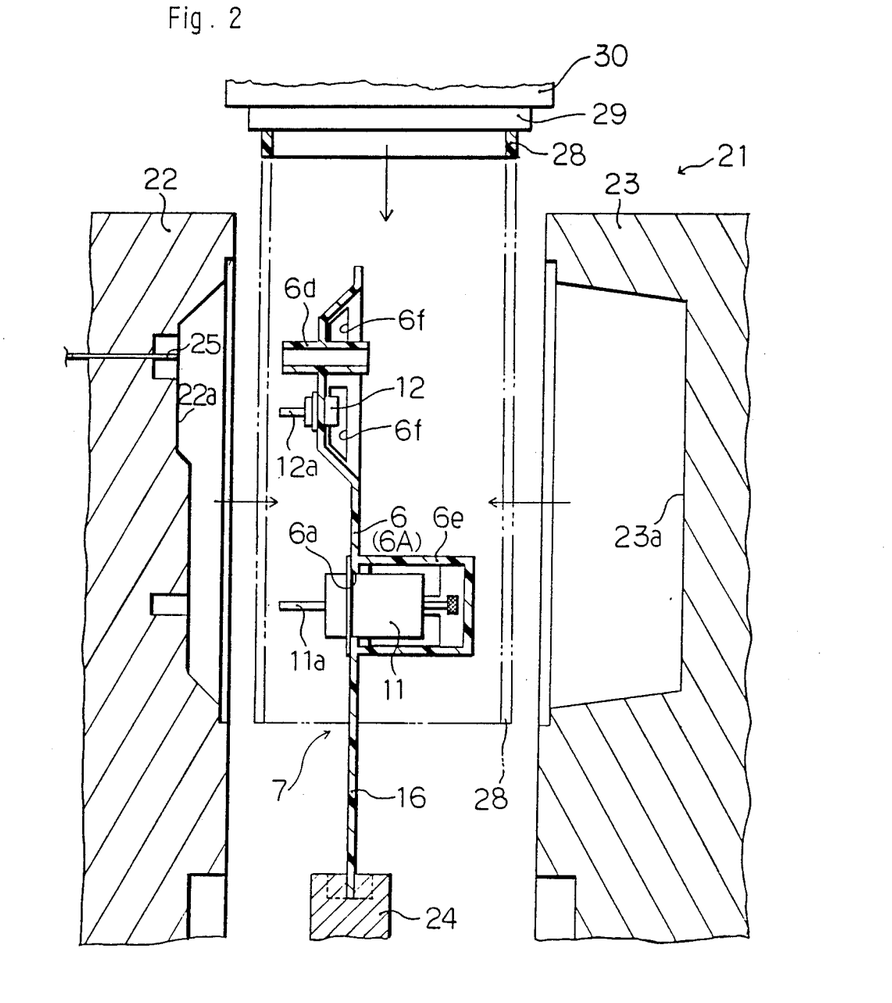
FIG. 2 is a sectional view illustrating a state where the insert member within the tank in the first embodiment is set to the mold.

The mold 21 for the blow molding of the outside wall 2, as shown in FIG. 2, is arranged at lower side of a head 29 of a molding machine 30, and is composed of a split mold 22 having a mold surface 22a to form the upper wall 3, a split mold 23 having a mold surface 23a to form the side wall 4 and the bottom wall 5, and a support mold 24 to hold the set portion 16 of the holding plate 6.

The mold surface 22a of the split mold 22 is provided with not only a prescribed recess to form the covering portions 3a, 3b, 3c, 3d in the upper wall 3 of the tank 1 but also a prescribed recess to form the nipple portion 3e. Numeral 25 designates an air blowing port for blowing air into a parison 28 extruded from the head 29.

The mold 21 is constructed so that the split molds 22, 23 are opened or closed perpendicular to the base portion 6A of the holding plate 6 on which the mold 21 is set. At the tightening state of the split molds 22, 23, the outer periphery of the base portion 6A of the holding plate 6 is grasped by a parison 28 and pressed.

Next, manufacturing of the fuel tank 1 will be described.

The holding plate 6, having the set portion 16 and the pipe portion 6d and formed by injection molding, the fuel pump 11, the fuel cutoff valve 12 and the fuel level gauge 13, being component parts within the tank 1, are joined together utilizing thread tightening, welding or the like through the assembling holes 6a, 6b, 6c, thereby the insert member 7 within the tank 1 is assembled. Then, each of the nipple portions 11a, 12a, 13a is arranged in direction that the axial center is perpendicular to the base portion 6A.

As shown in FIG. 2, the base portion 6A is made perpendicular to the tightening direction of the mold 21 in the opened state. The set portion 16 of the insert member 7 is held to a support mold 24.

The cylindrical parison 28 extruded from the head 29 of the molding machine 30 is arranged around the insert member 7 along the base portion 6A.

The mold tightening is performed, and the air blowing port 25 is inserted from position of the pipe portion 6d into the parison 28 and air is blown into the parison 28. The outside wall 2 is formed by blow molding (refer to FIG. 1). Since the outer periphery of the base portion 6A of the holding plate 6 is grasped by the parison 28 and pressed then, the melting bonding strength becomes good. The covering portions 3a, 3b, 3c, 3d are pressed in cap shape to the nipple portions 11a, 12a, 13a of the fuel pump 11, the fuel cutoff valve 12 and the fuel level gauge 13 being component parts and the outer periphery of the pipe portion 6d of the holding plate 6.

Figure 1:
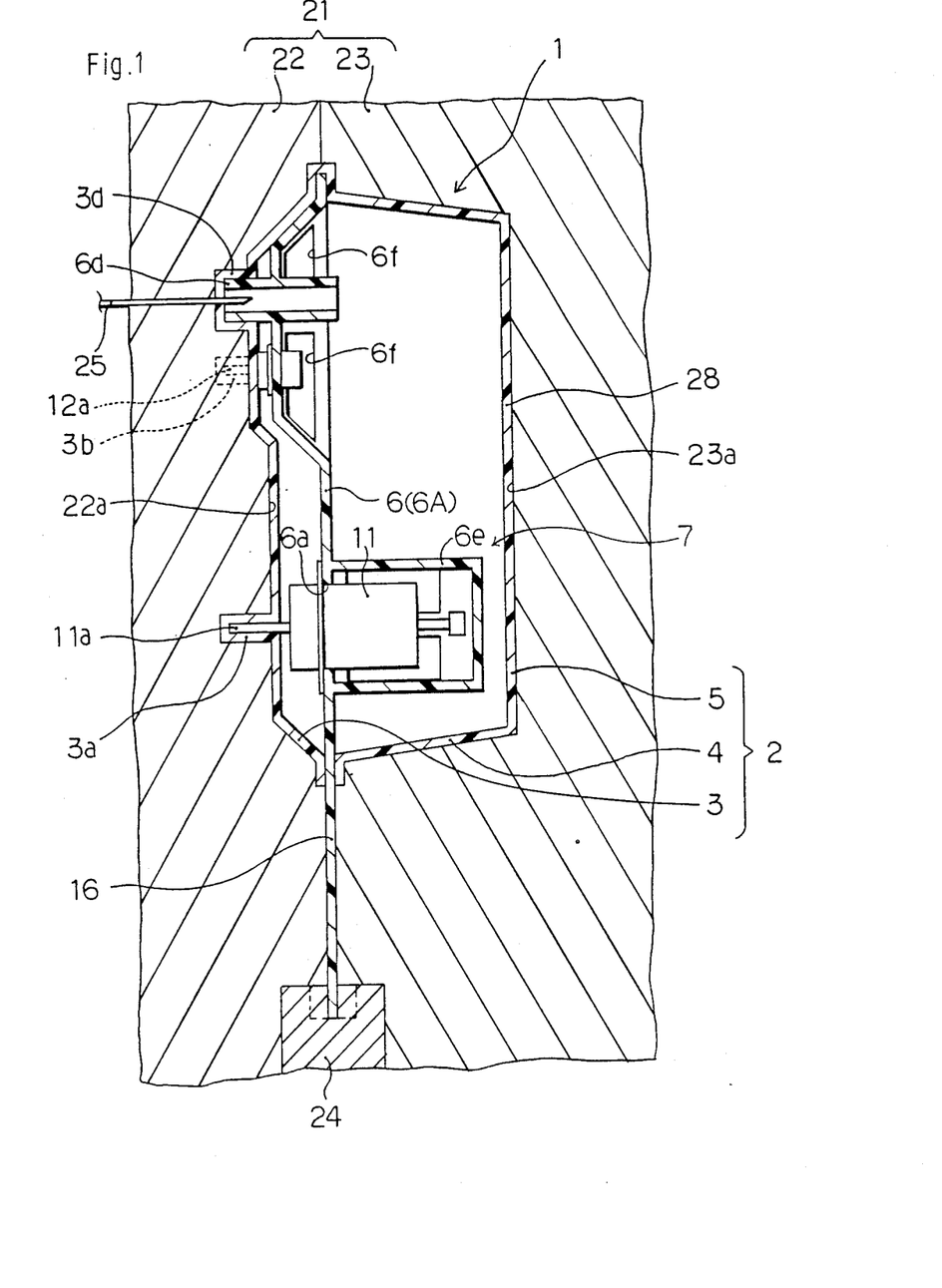
FIG. 1 is a sectional view of a mold during blow molding as a first embodiment of the invention.

After the cooling, the mold opening is performed and the contents are taken out, and the covering portions 3a, 3b, 3c, 3d formed in cap shape and the top end of the nipple portion 3e and the set portion 16 are cut off, thereby the prescribed fuel tank 1 can be obtained.

In the fuel tank 1 manufactured in such manner, the outside wall 2 is formed by the blow molding, and at the same time the component parts being the fuel pump 11, the fuel cutoff valve 12, the fuel level gauge 13 and the like can be arranged within the outside wall 2 through the holding plate 6. The covering portions 3a, 3b, 3c, 3d of the upper wall 3 in the outside wall 2 are pressed to the nipple portions 11a, 12a, 13a of the component parts and the outer circumferential surface of the pipe portion 6d of the holding plate 6. The airtightness of the outside wall 2 to the atmosphere can be secured without assembling a rubber part for a seal.

In the first embodiment, although the set portion 16 of the base portion 6A is utilized so as to set the insert member 7 to the mold 21, for example, when the base portion 6A is suspended in midair from the center of the head 29 using a string or the like, the set portion 16 is not installed but holding plate 6 may be formed by injection molding.

Figure 6:
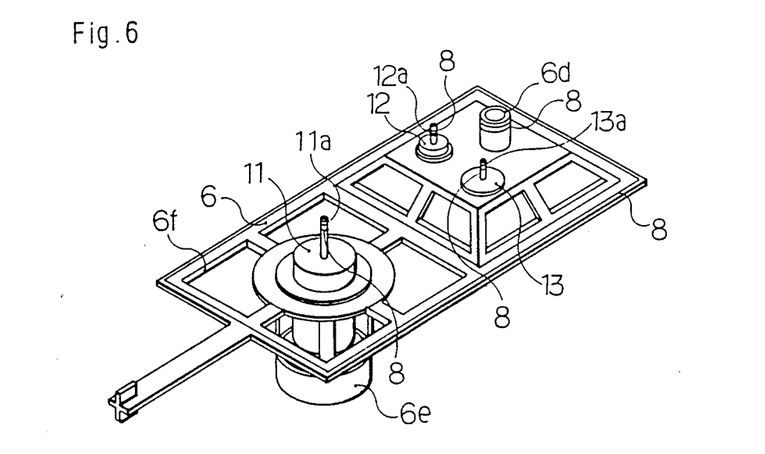
FIG. 6 is a perspective view illustrating a modification of a insert member to be used in the first embodiment.

Also in the first embodiment, in order to improve the air tightness in the side wall 4, the outer periphery of the base portion 6A of the holding plate 6, the covering portions 3a, 3b, 3c and the nipple portions 11a, 12a, 13a in the component parts respectively, a wire material 8 having conductivity, such as iron wire may be previously arranged on the outer periphery of the base portion 6A of the holding plate 6 and the nipple portions 11a, 12a, 13a. The outside wall 2 may be formed by blow molding and then heated in high-frequency heating, thereby improving the melting bonding strength between these parts (refer to FIG. 6).

Figure 7:
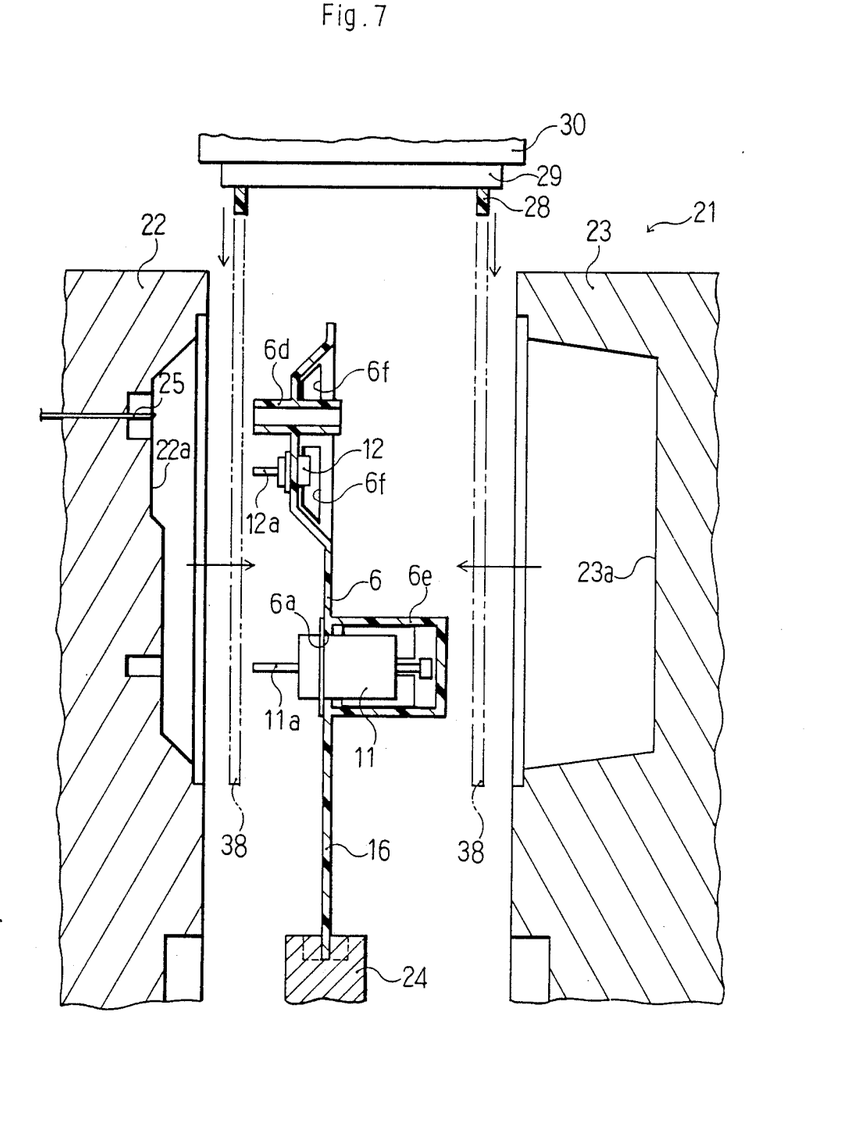
FIG. 7 is a sectional view illustrating a modification of a parison to be used in the first embodiment.

Further in the first embodiment, although the cylindrical parison 28 for extrusion from the head 29 is exemplified, the parison 28 may be composed of two sheets of parisons 38 as shown in FIG. 7.

Figure 8:
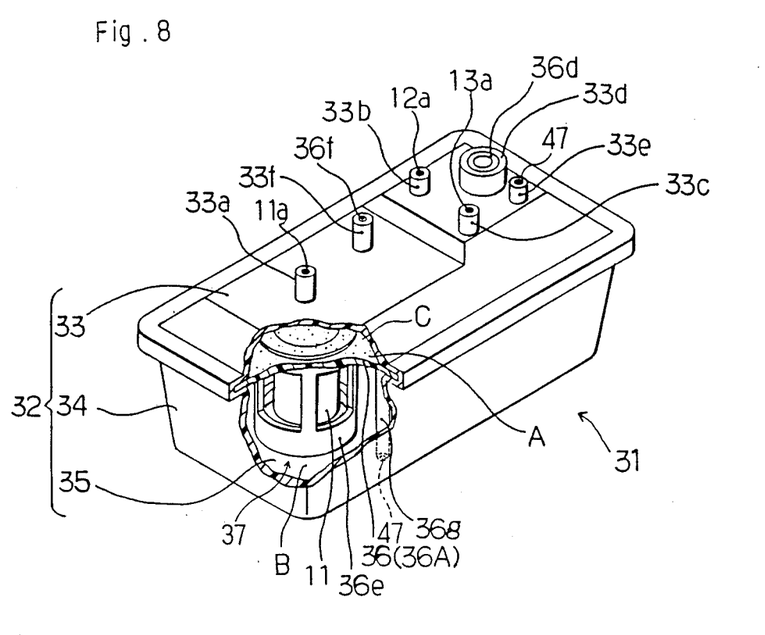
FIG. 8 is perspective view partly cutaway of a fuel tank to be manufactured by a second embodiment.

A second embodiment will now be described. A fuel tank 31 manufactured in the second embodiment, a shown in FIG. 8, is in rectangular parallelepiped form where a side wall 34 surrounds between a rectangular upper wall 33 and a bottom wall 35, and an insert member 37 is arranged through a holding plate 36 of synthetic resin which is fixed and held so as to be grasped by the inner circumferential surface of the side wall 34.

The fuel tank 31 functions as a charcoal canister which adsorbs a fuel evaporation gas generated at the fuel supplying state into the tank 31 (refer to Japanese Utility Model Laid-open Publication No. Sho 61-67237). The inside of the fuel tank 31 is divided by a supporting plate 36 of synthetic resin into two chambers, an upper chamber A and a lower chamber B, being airtight. Activated carbon C is infused in the upper chamber A and fuel is stored in the lower chamber B.

The outside wall 32 and the holding plate 36 are made of similar material to that of the tank 1 in the first embodiment.

The upper wall 33 is protruded at the rear side in a similar manner to the tank 1 in the first embodiment. A covering portion 33a pressed to outer circumferential surface of a nipple portion 11a of a fuel pump 11 is formed at the center of front side of the upper wall 33, and covering portions 33b, 33c pressed to outer circumferential surface of a nipple portion 12a of a fuel cutoff valve 12 and outer circumferential surface of a nipple portion 13a of a fuel level gauge 13 are formed at rear side of the upper wall 33 (refer to FIGS. 8~10). A covering portion 33d pressed to outer circumferential surface of an upper pipe portion 36d to be connected to a fuel injection pipe 61 (refer to FIG. 14) is formed at rear side of the upper wall 33.

A covering portion 33f pressed to outer circumferential surface of an upper pipe portion 36f as hereinafter described is formed in the vicinity of intermediate position in the longitudinal direction of the upper wall 33. A nipple portion 33e for fuel evaporation gas connected to the fuel injection pipe 61 is formed at the rear side of the upper wall 33 (refer to FIG. 13). A covering portion 35a pressed to outer circumferential surface of a lower pipe portion 36g as hereinafter described (refer to FIGS. 12 and 13) is formed at the bottom wall 35.

Figure 9:
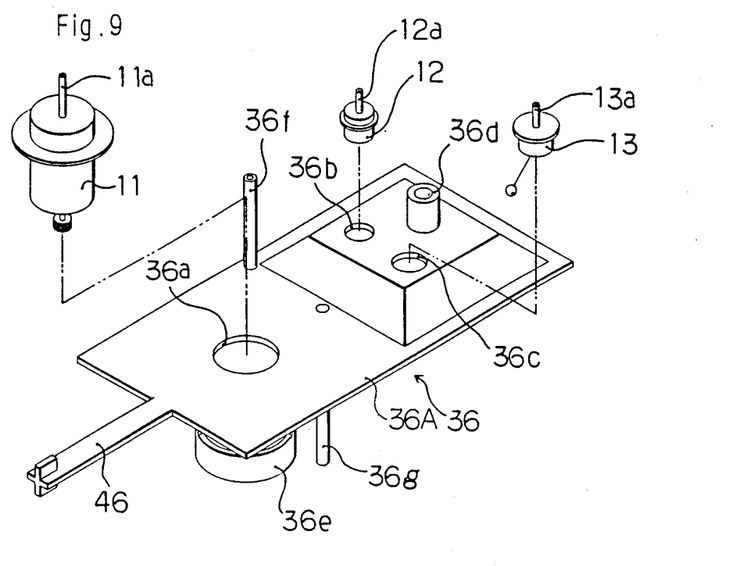
FIG. 9 is a perspective view of a holding plate to be used in the second embodiment.

The holding plate 36, in at similar manner to the tank 1 in the first embodiment, is provided with a base portion 36A of flat a plate form formed in the horizontal direction as shown in FIG. 9. The base portion 36A is protruded at the rear side. Assembling holes 36a, 36b, 36c for assembling the fuel pump 11, the fuel cutoff valve 12 and the fuel level gauge 13, an upper pipe portion 36d to be connected to the fuel injection pipe 61, a swivel tank 36e, and a set portion 46 are formed respectively at prescribed positions of the base portion 36A.

Figure 12:
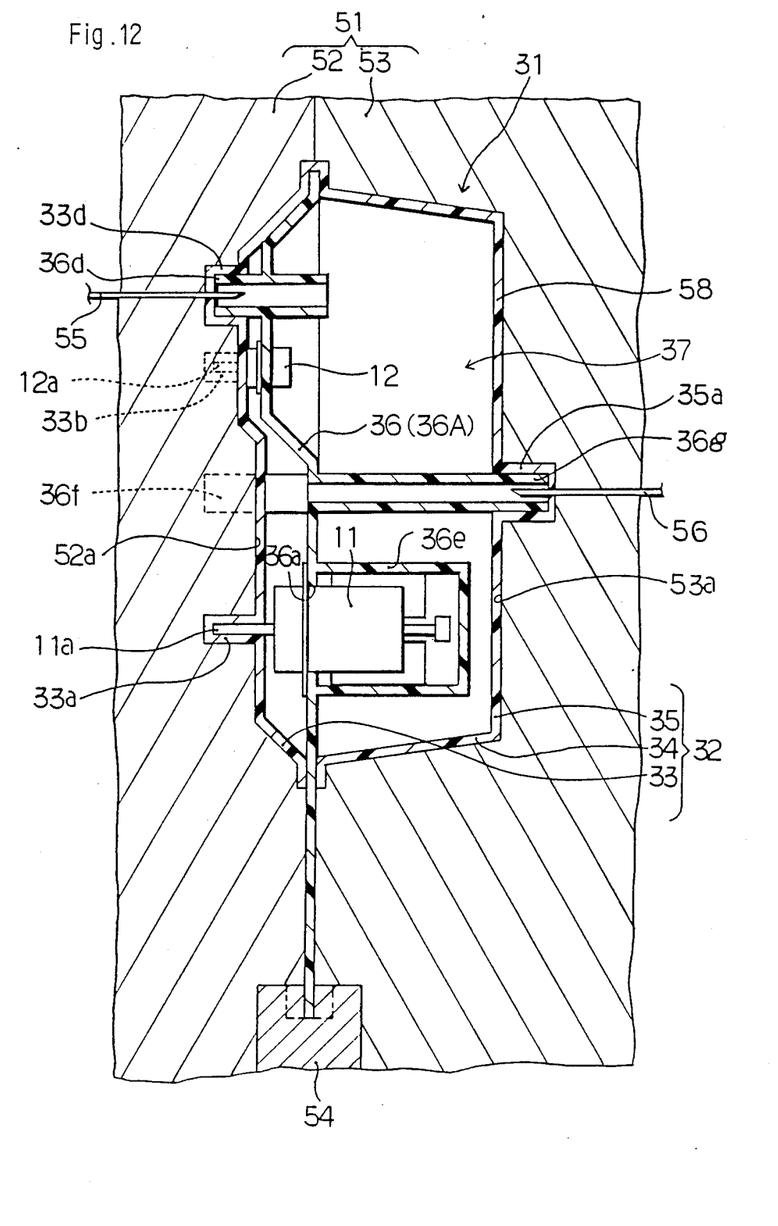
FIG. 12 is a sectional view of the mold during blow molding in the second embodiment.

Being different from the tank 1 in the first embodiment, no through hole 6f is formed at the base portion 36A, but an upper pipe portion 36f extending upward and a lower pipe portion 36g extending downward are formed. The upper pipe portion 36f is for return fuel, and the lower pipe portion 36g as shown in FIG. 12 has the upper chamber A connected to an intake manifold I of an engine E.

The holding plate 36, in a manner similar to the tank 1 in the first embodiment, is formed integrally with each part by injection molding. Fixing of the fuel pump 11, the fuel cutoff valve 12 and the fuel level gauge 13 to the holding plate 36 is formed using prescribed thread tightening, welding or the like after being inserted to each of the assembling holes 36a, 36b, 36c, and in order to secure the air tightness between the upper chamber A and the lower chamber B during fixing them the fixing work is performed through a packing for seal.

Figure 11:
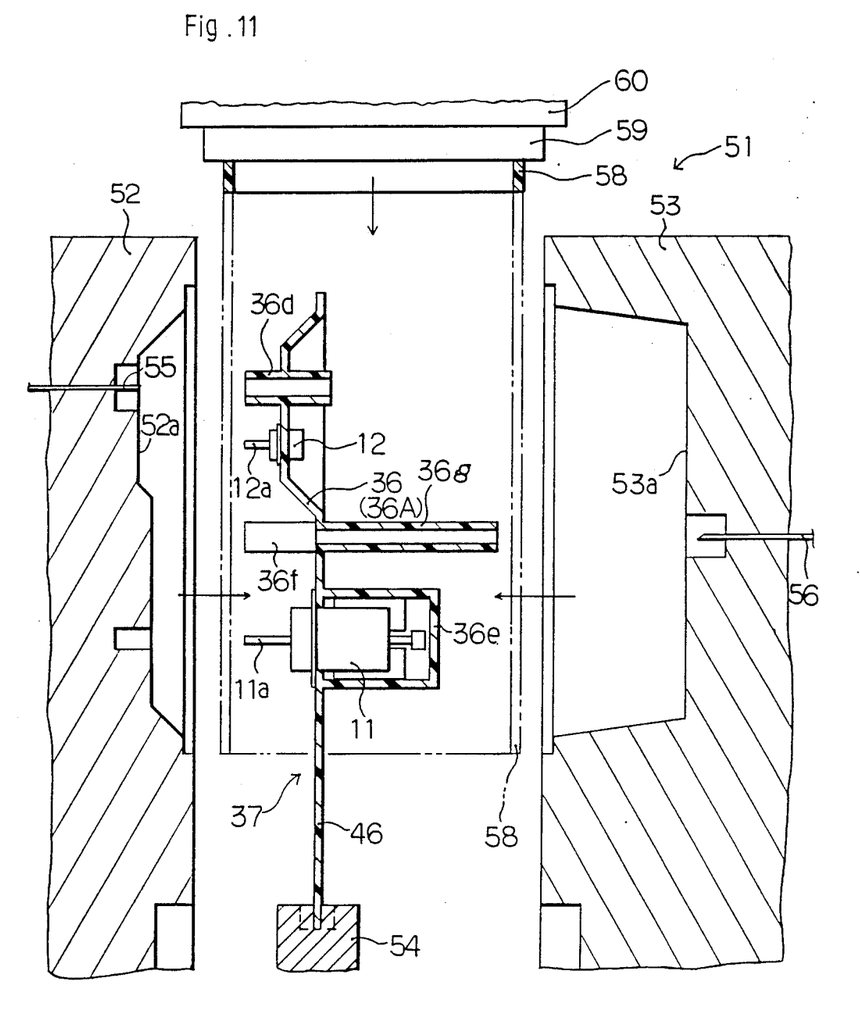
FIG. 11 is a sectional view illustrating the state where the insert member in the second embodiment is set to the mold.

A mold 51 for the blow molding of the outside wall 32, as shown in FIG. 11, is arranged at lower side of a head 59 of a molding machine 60 in similar manner to the mold 21 in the first embodiment, and is composed of split molds 52, 53 having prescribed mold surfaces 52a, 53a, and support mold 54 to hold the set portion 46 of the holding plate 36. Numerals 55, 56 designate air blowing ports for blowing air into a cylindrical parison 58 extruded from the head 59.

Next, manufacturing of the fuel tank 31 will be described.

Figure 10:
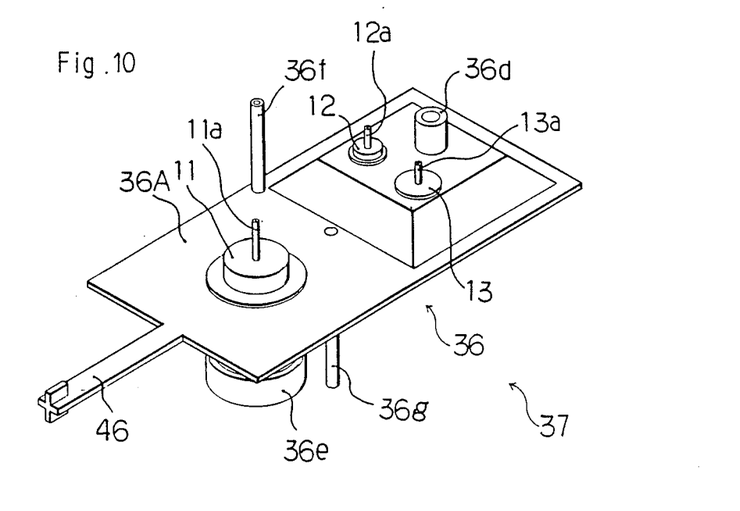
FIG. 10 is a perspective view of an insert member to be used in the second embodiment, illustrating the state where the component parts are fixed to the holding plate.

To the holding plate 36 having the set portion 46, the upper pipe portions 36d, 36f and the lower pipe portion 36g and formed by injection molding, the fuel pump 11, the fuel cutoff valve 12 and the fuel level gauge 13 being component parts are fixed utilizing packing, thread tightening, welding or the like through the assembling holes 36a 36b, 36c, thereby the insert member 37 within the tank 31 is assembled.

As shown in FIG. 11, the insert member 37 is set to the mold 51 in opened state and the set portion 46 is held to the supportmold 54.

The parison 58 extruded from the head 59 of the molding machine 60 is arranged around the insert member 37 along the base portion 36A.

The mold tightening is performed, and the air blowing ports 55, 56 are inserted into the parison 58 and air is blown into the parison 58, and the outside wall 32 is formed by blow molding (refer to FIG. 12). Since the outer periphery of the base portion 36A of the holding plate 36 is grasped by the parison 58 and pressed then in similar manner to the first embodiment, the air tightness between the upper chamber A and the lower chamber B can be secured.

The covering portions 33a, 33b, 33c, 33d, 33f, 35a are pressed in cap shape to the nipple portions 11a, 12a, 13a of the fuel pump 11, the fuel cutoff valve 12 and the fuel level gauge 13 and the outer circumferential surface of the upper pipe portions 36d, 36f and the lower nipple 36g of the holding plate 36.

After the cooling, the mold opening is performed and the content is taken out, and the covering portions 33a, 33b, 33c, 33d, 33f, 35a formed in cap shape and the top end of the nipple portion 33e and the set portion 46 are cut off.

And then a filter 47 having meshes of amount not to pass the activated carbon C is fitted to the top end of the nipple portion 33e. Vacuum suction is performed from the nipple portion 33e, and the activated carbon is filled from the top end of the lower pipe portion 36g into the upper chamber A. After the activated carbon A is filled in the upper chamber A, the filter 47 having meshes of amount not to pass the activated carbon C is fitted to the top end of the lower pipe portion 36g, thereby the prescribed fuel tank 31 can be obtained.

Figure 13:
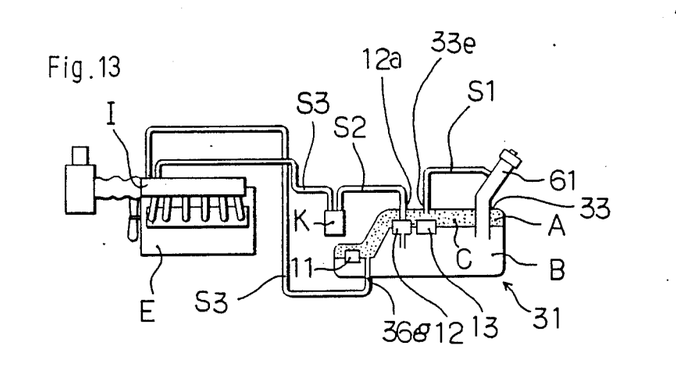
FIG. 13 is a schematic diagram illustrating the use mode of the fuel tank manufactured by the second embodiment.

In the use mode of the fuel tank 31, as shown in FIG. 13, a prescribed tube is connected to the nipple portion 33e formed at the upper wall 33, and the nipple portion 33e and the fuel injection pipe 61 are connected thereby a first flow path S1 is formed. Also a prescribed tube is connected to the nipple portion 12a of the fuel cutoff valve 12, and the fuel cutoff valve 12 and the charcoal canister K are connected thereby a second flow path S2 is formed. Further a prescribed tube is connected to the lower pipe portion 36g and a prescribed tube is connected to the charcoal canister K, and the lower pipe portion 36g is connected to the intake manifold I and the charcoal canister K is connected to the intake manifold I, thereby two third flow paths S3 are formed.

Figure 14:
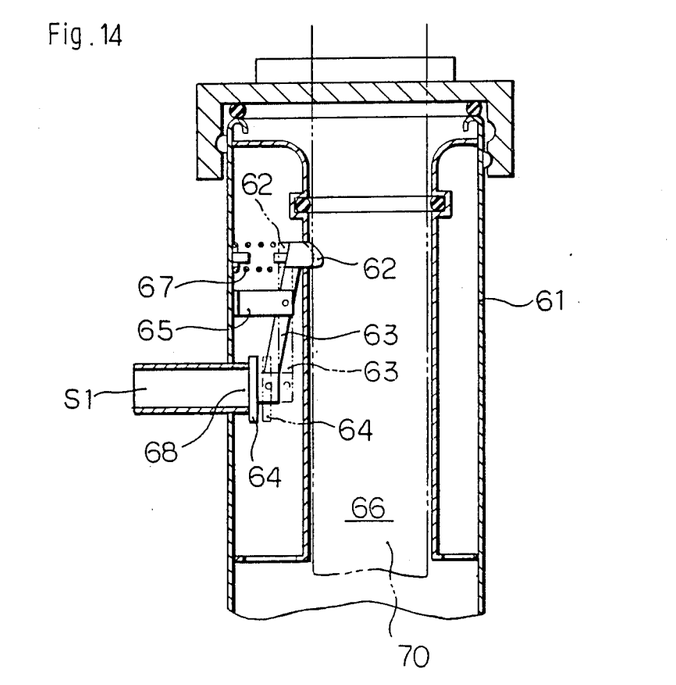
FIG. 14 is a sectional view of a fuel injection pipe to be connected to the fuel tank manufactured by the second embodiment.

In the fuel injection pipe 61 as shown in FIG. 14, the first path S1 is connected to its side surface, and a valve body 64 is arranged at an opening portion 68 of the first flow path S1 to a pipe 61. The valve body 64 is arranged to lower end of a lever 63 pivotally supported to a bracket 65, and an abutting portion 62 projected to an insertion path 66 is formed on upper end of the lever 63. The abutting portion 62 is biased to project normally to the insertion path 66 by a spring 67.

Consequently, when an injection nozzle 70 for fuel supplying is inserted in the fuel injection pipe 61, the injection nozzle 70 abuts on the abutting portion 62 and the valve body 64 is moved through the lever 63 thereby the opening portion 68 of the first flow path S1 is opened. In this case, the fuel evaporation gas generated at large amount flows through the first flow path S1 and the nipple 33e into the upper chamber A and adsorbed to the activated carbon C in the upper chamber A.

The charcoal canister K adsorbs the fuel evaporation gas which flows from the inside of the tank 31 through the second flow path S2 during the engine stopping.

In the third flow path S3, the fuel evaporation gas adsorbed to the activated carbon in the upper chamber A and the charcoal canister K is transmitted to the engine E during acting and burned.

Accordingly, in the second embodiment, the fuel tank 31 also having function of the charcoal canister can be manufactured simply and easily.

Figure 16:
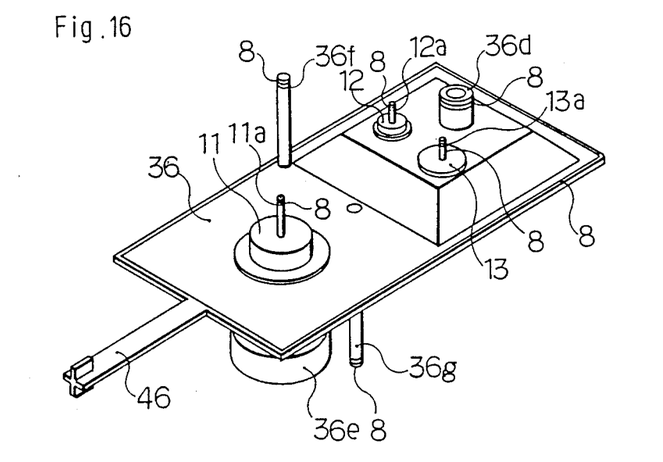
FIG. 16 is a perspective view illustrating a modification of the component parts to be used in the second embodiment.

Also in the second embodiment, in a similar manner to the first embodiment, in order to improve the airtightness to the outside wall 23, the wire material 8 having conductivity may be previously arranged on the nipple portions 11a, 12a, 13a of the component parts, the upper and lower pipe portions 36d, 36f, 36g and the outer periphery of the base portion 36A, and after the blow molding of the outside wall 32, these portions may be heated in high-frequency heating (refer to FIG. 16).

Figure 17:
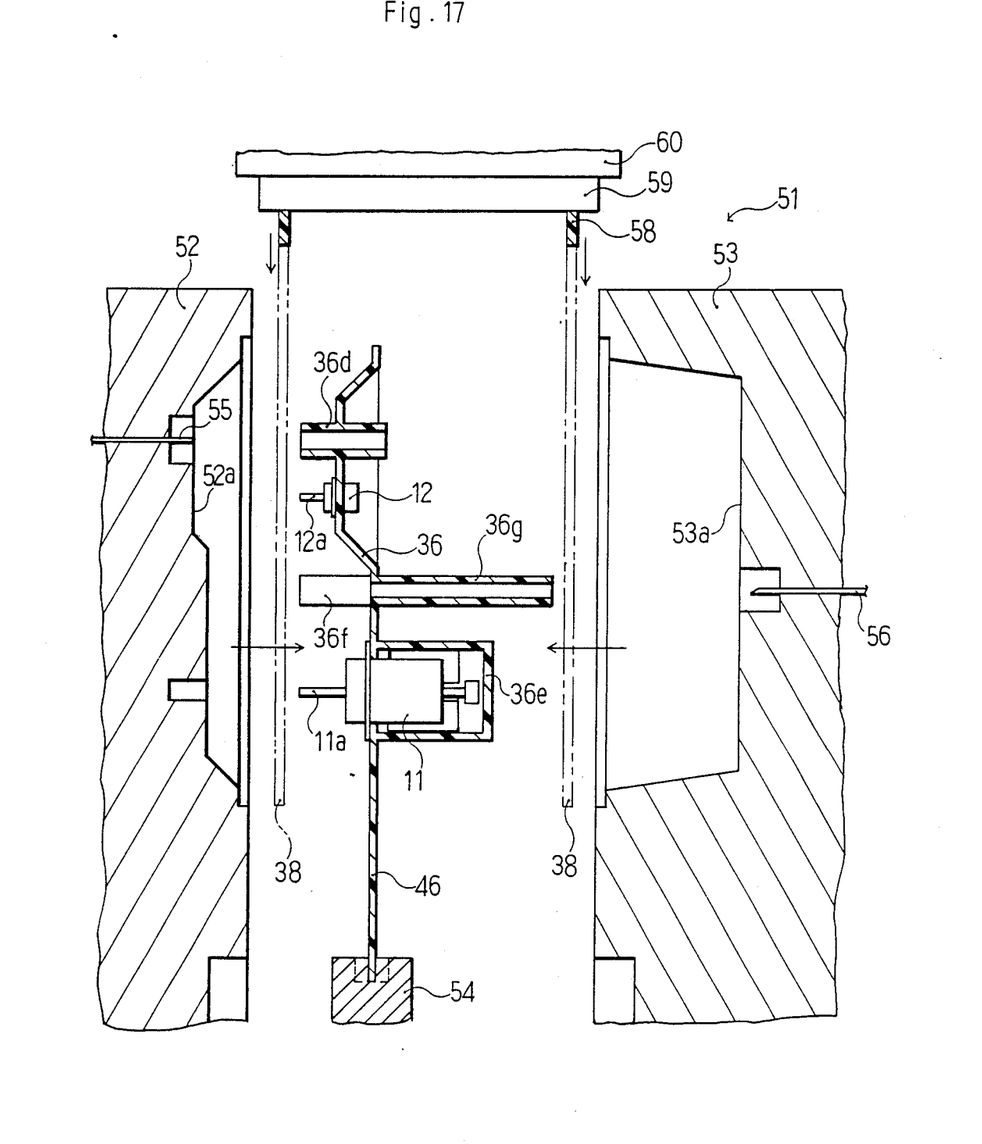
FIG. 17 is a sectional view illustrating a modification of a parison to be used in the second embodiment.

In the second embodiment, although the cylindrical parison 58 for extrusion from the head 59 is exemplified, the parison 58 may be composed of two sheets of parisons 38 (refer to FIG. 17).

Figure 15:
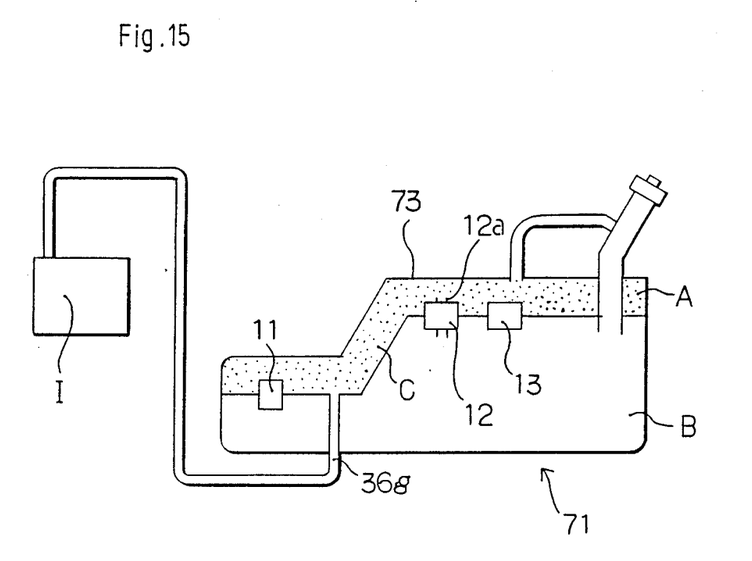
FIG. 15 is a schematic diagram illustrating the use made of another fuel tank manufactured by the second embodiment.

Further the fuel tank 31 manufactured in the second embodiment has been described in an example of that having function of adsorbing the fuel evaporation gas generated at fuel supplying state, as shown in the fuel tank 71 of FIG. 15, function of an ordinary charcoal canister of adsorbing the fuel evaporation gas flowing from the inside of the tank 71 (lower chamber B) at the engine stopping state may be also provided.

In this case, the nipple portion 12a of the fuel cutoff valve 12 may be opened in the upper chamber A.

What is claimed is:

1. Method of manufacturing a fuel tank of synthetic resin which is provided with an insert member arranged within the tank, and with an outside tank wall covering said insert member and formed by blow molding using a parison of thermoplastic resin and a mold for blow molding to form a cavity of prescribed shape at a mold tightening state, said insert member being composed of a component part with a nipple portion projected from said outside tank wall and a holding plate of synthetic resin holding said component part and arranged in the horizontal direction, said method comprising the steps of:

(a) arranging the axial direction of the nipple portion of the component part in a perpendicular direction to the holding plate and fixing the component part to the holding plate and assembling said insert member;

(b) setting said insert member into the mold, which is in an open state, so that the holding plate is arranged in a perpendicular direction to the mold tightening, direction of the mold;

(c) arranging the parison around said insert member and the holding plate;

(d) tightening the mold and thereby pressing the parison against the outer periphery of the holding plate and also thereby pressing an outer circumferential surface of the nipple portion of the component part into a protruded section of the mold cavity so that the parison surrounds said nipple portion to form a covering portion, and injecting air into the parison to thereby press the parison against an inner circumferential surface of the mold, thus forming said outside tank wall by blow molding;

(e) removing a molded article from the mold, said molded article being molded by the mold; and (f) cutting and removing the parison portion covering the top end surface of the nipple portion of the component part in the molded article removed from the mold.

2. Method of manufacturing a fuel tank of synthetic resin which is provided with an insert member arranged within the tank, and with an outside tank wall covering said insert member and formed by blow molding using a parison of thermoplastic resin and a mold for blow molding to form a cavity of a prescribed shape at a mold tightening state, said outside tank wall having an upper wall, a bottom wall and a side wall, said insert member being composed of a component part with a nipple portion projecting upward from the upper wall of said outside tank wall and a holding plate of synthetic resin holding said component part, said holding plate having a base portion of a flat plate shape including a through hole and arranged in a horizontal direction, and a pipe portion projecting upward from the base portion to the upper wall of said outside tank wall, said method comprising the steps of:

(a) arranging the axial direction of the nipple portion of the component part in a perpendicular direction to the base portion of the holding plate and fixing the component part to the holding plate and assembling said insert member;

(b) setting said insert member into the mold, which is in an open state, so that the base portion of the holding plate is arranged in a perpendicular direction to the mold tightening direction of the mold;

(c) arranging the parison around said insert member and the base portion of the holding plate;

(d) tightening the mold and thereby pressing the parison against the outer periphery of the holding plate and also thereby pressing an outer circumferential surface of the nipple portion of the component part into a protruded section of the mold cavity so that the parison surrounds said nipple portion to form a covering portion and the outer circumferential surface of the pipe portion of the holding plate, and injecting air into the parison to thereby press the parison against an inner circumferential surface of the mold, thus forming said outside tank wall by blow molding;

(e) removing a molded article from the mold, said molded article being molded by the mold; and (f) cutting and removing the parison portion covering respective top end surfaces of the nipple portion of the component part and the pipe portion of the holding plate in the molded article removed from the mold.

3. Method of manufacturing a fuel tank of synthetic resin as set forth in claim 2, wherein the blow molding mold includes split molds movable to the open state and a support mold arranged between said split molds, the holding plate is provided with a set portion extending outward from the base portion, said method further comprising:

in step (b), holding the set portion using the support mold while setting said insert member into the mold which is in the open state; and in step (f), cutting the set portion.

4. Method of manufacturing a fuel tank of synthetic resin as set forth in claim 2, wherein a wire material having a conductivity is previously arranged on the outer circumferential surface of the nipple portion of the component part and the outer circumferential surface of the pipe portion of the holding plate and the outer periphery of the base portion respectively, the method further comprising:

after step (e), performing high-frequency heating of the nipple portion and the pipe portion and the outer periphery of the base portion.

5. Method of manufacturing a fuel tank of synthetic resin as set forth in claim 2, wherein the parison used in step (c) is of cylindrical shape.

6. Method of manufacturing a fuel tank of synthetic resin as set forth in claim 2, wherein the parison used in step (c) includes two sheets with the holding plate arranged therebetween and opposed in parallel to the base portion of the holding plate.

7. Method of manufacturing a fuel tank of synthetic resin as set forth in claim 2, wherein the component part is a fuel level gauge.

8. Method of manufacturing a fuel tank of synthetic resin as set forth in claim 2, wherein a plurality of component parts are installed, and at least one of them is a fuel level gauge.

9. Method of manufacturing a fuel tank of synthetic resin as set forth in claim 2, wherein in step (d), said air is injected into the parison from a position within the pipe portion of the holding plate.

10. Method of manufacturing a fuel tank of synthetic resin which is provided with an upper chamber filled with activated carbon to adsorb fuel evaporation gas, a lower chamber for storing fuel, an insert member arranged within the tank, and a tank outside wall constructed of a circumferential wall of the upper chamber and the lower chamber said outside wall covering said insert member and formed by blow molding using a parison of thermoplastic resin and a mold for blow molding to form a cavity of prescribed shape at a mold tightening state, said outside wall having an upper wall with a nipple portion for fuel evaporation gas which projects upward, a bottom wall and a side wall, said insert member being composed of a component part with a nipple portion projecting from the lower chamber to upper side of the upper wall and a holding plate of synthetic resin holding said component part and acting as a partition wall between the upper chamber and the lower chamber, said holding plate having a base portion of a flat plate shape arranged in the horizontal direction and an upper pipe portion for fuel flow projecting to an upper side of the upper wall and penetrating it, and a lower pipe portion for fuel evaporation gas projecting from the base portion to a lower side of the bottom wall and penetrating it, said method comprising the steps of:

(a) arranging the axial direction of the nipple portion of the component part in a perpendicular direction to the base portion of the holding plate and fixing the component part to the holding plate and assembling said insert member;

(b) setting said insert member into the mold, which is in an open state, so that the base portion of the holding plate is arranged in a perpendicular direction to the mold tightening direction of the mold;

(c) arranging the parison around said insert member and the base portion of the holding plate;

(d) tightening the mold and thereby pressing the parison against the outer periphery of the holding plate and also thereby pressing an outer circumferential surface of the nipple portion of the component part and the outer circumferential surface of the upper and lower pipe portions of the holding plate, the parison surrounding said nipple portion to form a covering portion, said nipple portion being pressed into a protruded section of the mold cavity, and injecting air into the parison to thereby press the parison against an inner circumferential surface of the mold, thus forming said outside tank wall by blow molding;

(e) removing a molded article from the mold, said molded article being molded by the mold;

(f) cutting and removing the parison covering respective top end surfaces of the nipple portion of the outside tank wall and the nipple portion of the component part and the upper and lower pipe portions of the holding plate in the molded article removed from the mold; and (g) filling the upper chamber with the activated carbon.

11. Method of manufacturing a fuel tank of synthetic resin as set forth in claim 10, wherein the blow molding mold is composed of split molds movable to the open state and a support mold arranged between said split molds, with the holding plate being provided with a set portion extending outward from the base portion, the method further comprising the steps of:

in step (b), holding the set portion using the support mold while setting said insert member in the mold in the state; and in step (f), cutting the set portion.

12. Method of manufacturing a fuel tank of synthetic resin as set forth in claim 10, wherein a wire material having a conductivity is previously arranged on the outer circumferential surface of the nipple portion of the component part and the outer circumferential surface of the pipe portion of the holding plate and the outer periphery of the base portion respectively, said method further comprising:

after step (e), performing high-frequency heating of the nipple portion and the pipe portion and the outer periphery of the base portion.

13. Method of manufacturing a fuel tank of synthetic resin as set forth in claim 10, wherein the parison used in step (c) is of cylindrical shape.

14. Method of manufacturing a fuel tank of synthetic resin as set forth in claim 10, wherein the parison used in step (c) includes two sheets with the holding plate arranged therebetween and opposed in parallel to the base portion of the holding plate.

15. Method of manufacturing a fuel tank of synthetic resin as set forth in claim 10, wherein the component part is a fuel level gauge.

16. Method of manufacturing a fuel tank of synthetic resin as set forth in claim 10, wherein a plurality of component parts are installed, and at least one of them is a fuel level gauge.

17. Method of manufacturing a fuel tank of synthetic resin as set forth in claim 10, wherein in step (d), said air is injected into the parison from a position within the upper pipe portion and the lower pipe portion of the holding plate.

18. Method of manufacturing a fuel tank of synthetic resin as set forth in claim 10, wherein step (g) further comprises installing a filter to inhibit passing of the activated carbon at the nipple portion of the upper wall, and suction is performed from the nipple portion of the upper wall and the activated carbon is injected from the lower pipe portion of the holding plate, and the activated carbon is filled in the upper chamber, and then a filter to inhibit passing the activated carbon is installed at the lower portion of the holding plate.

* * * * *